Nov. 15, 1932.         LE ROY C. SCHENCK         1,887,521
                       VALVE MECHANISM
                      Filed Oct. 30. 1928
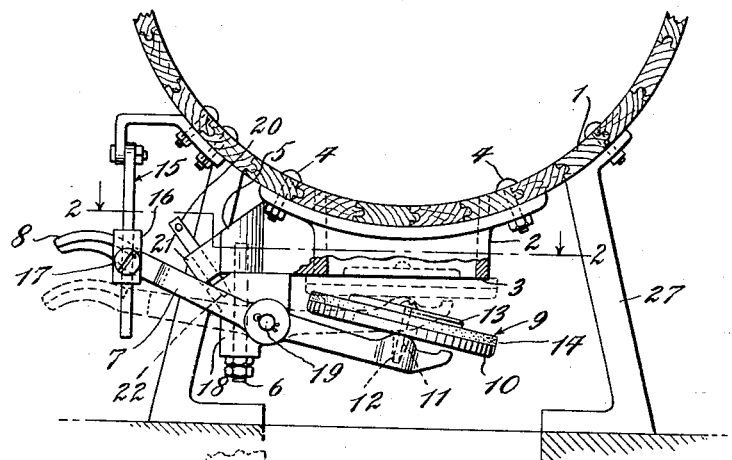
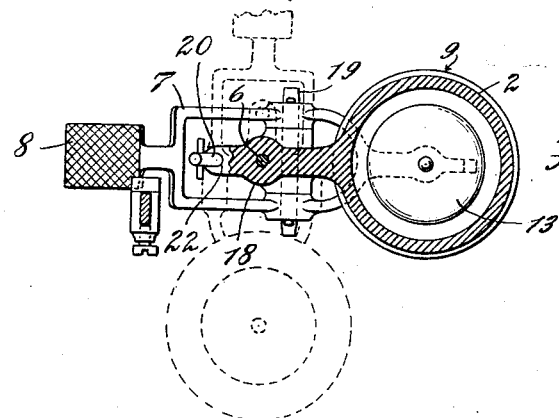
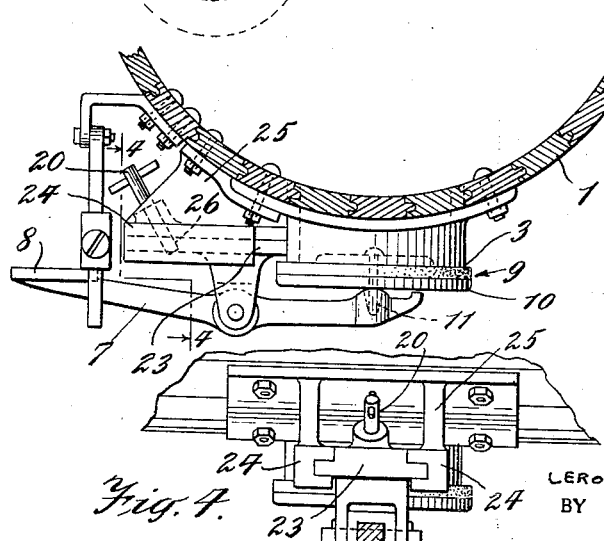
INVENTOR:
LEROY CHOATE SCHENCK
BY
ATTORNEY Patented Nov. 15, 1932

1,887,521

UNITED STATES PATENT OFFICE

LE ROY CHOATE SCHENCK, OF MOLINE, ILLINOIS, ASSIGNOR TO TROY LAUNDRY MACHINERY COMPANY, INC., OF NEW YORK, N. Y., A CORPORATION OF DELAWARE

VALVE MECHANISM

Application filed October 30, 1928. Serial No. 315,963.

This invention relates to valve mechanisms particularly to dump valves used in laundry machinery.

It is an object of the present invention to construct a dump valve mechanism so arranged as to be readily accessible for inspection and repairs.

Dump valves used in laundry machinery such as the drum type washer, have to be placed at the bottom of the drum in order to drain off all water when the valve is opened. The drums of washing machines of commercial size are so large, and usually placed so close to the floor that it is very hard to get at the valve mechanism to make necessary repairs. The part of the valve which wears out first and therefore which gives the most trouble is the valve gasket or composition washer which cooperates with the valve seat when the valve is in closed position. The ordinary dump valve used in laundry equipment comprises a valve seat forming an opening in the tank to which the valve is attached, and a cooperating valve disc. This valve disc carries the gasket or composition washer mentioned above, and is in turn supported by a rockably mounted operating lever. With this type of valve it has been necessary in order to replace the valve washer or gasket to crawl underneath the machine and disconnect the valve disc from the operating lever so that the disc can be removed from the machine for the necessary repairs.

In accordance with my invention I avoid the difficulty of reaching the valve disc by arranging the lever by which the disc is supported so that it can be moved into such a position that the disc is placed in an accessible position.

According to a preferred embodiment of my invention I support the valve operating lever on a swivel block rotatably secured to the frame of the machine. The swivel block is mounted so that the lever carrying the valve disc can be rotated in a substantially horizontal plane so that the disc can be turned away from the valve seat, along the arc of a circle through an angle of 90 or more degrees, so that it extends out toward the front of the machine, where it can readily be worked on.

In order to hold the lever in its proper operating position, with the valve disc adjacent to the valve seat, I provide a locking device such as a holding pin which projects through a hole in the fixed support into a hole in the swivel block. This is my preferred construction, but other arrangements might be used as well. The valve disc mechanism might, for example, be secured to a member slidably mounted in a track fixed to the frame of the machine and held in place by a locking device similar to that described above.

In the drawing, Fig. 1 illustrates in elevation and partly in section, a washing machine dump valve constructed in accordance with my invention.

Fig. 2 is a view along section lines 2—2 of Fig. 1.

Fig. 3 shows a view in elevation of a modified form of valve mechanism.

Fig. 4 is a vertical section view taken along section line 4—4 of Fig. 3.

Referring more particularly to the drawing, reference numeral 1 indicates a tank or drum supported by a frame 27. This tank or drum may be the shell of a laundry washer or similar device. Secured to the bottom of the tank is a valve outlet 2 which has seat portion 3. The valve outlet is secured to the tank by means of bolts 4 and carries a supporting bracket 5. The bracket 5 has rotatably secured thereto by means of a stud 6, a swivel block 18 which supports, by means of pivot pin 19, the valve operating lever 7. This lever has at one end a foot treadle portion 8 and at the other end a valve disc 9. This valve disc comprises a metal supporting plate 10 having a projection 11 seated in a pocket in the end of the lever 7. Placed on top of the disc 10 and held by a retaining washer 13, is a gasket or composition disc 14. The valve disc as a unit cooperates with the valve seat 3 to close the opening thereon when the foot treadle 8 is depressed. In order to hold the valve closed a swinging catch mechanism 15 is provided. This catch, when the treadle 8 is depressed, swings of its own accord to a vertical position so that a holding member 16 rests over the top of the lever 7 and holds the lever in closed position, thereby preventing the valve from opening when pressure is released from the foot treadle 8. As shown in the drawings, the holding member 16 can be adjusted up or down by means of a screw 17 to make up for any wear on the composition disc 14. In order to hold the swivel block 18 in such position that the valve disc 14 is in its operating relation with respect to the operating valve seat 3, a holding pin 20 is arranged to pass through lip 21 of the bracket 5 into a cooperating hole 22 in the swivel block.

With this type of arrangement, when it is desired to renew the composition disc 14, it is necessary merely to withdraw the holding pin 20 from the hole 22 and rotate the lever arm 7 carried by the swivel block 18, around the stud 6 through an angle of 90 degrees or more, so that the valve disc will be moved to a position where it will be accessible to a person at the side of the machine. The valve is shown in its rotated position by dotted lines in Fig. 2.

Referring more particularly to Figs. 3 and 4, the valve disc 9, lever arm 7, and valve seat 3 are just the same as shown in Figs. 1 and 2. The only difference in this case is the means for supporting the lever 7. The lever instead of being attached to a swivel block is secured to a head 23 slidably mounted in a track or holding arm 24 joined to a holding bracket 25, bolted to the drum 1. The valve disc 9, operating lever 7, and head 23 may all be removed entirely from the machine simply by grasping the lever 7 and pulling it away from the machine. The head 23 slides in the track 24 and permits the whole unit to be readily removed. In order to hold the valve mechanism in its operating position a holding pin 20, similar to the pin described in connection with the device shown in Fig. 1, may be provided. This pin passes through a portion of the holding bracket 25 into a hole 26 in the head 23.

While I have described a particular embodiment of my invention for the purpose of illustration, it will be understood that various modifications and adaptations occurring to one skilled in the art may be made without a departure from the spirit of the invention as set forth in the appended claims.

What I claim is:

1. In a dump valve mechanism, a valve seat, a valve disc, and means for supporting the disc in operating position, said last mentioned means comprising a member mounted movably so that the disc can be removed from cooperating position with respect to the seat, and means for locking said member in the operating position.

2. In a laundry washer, a drum, a dump valve mechanism located at the bottom of the drum, said mechanism comprising a valve seat, a valve disc cooperating with said seat, a lever rockably attached to a block and adapted to support the valve disc in operative position and means supporting the block for rotational movement, so that the valve disc can be moved out of operative position to a position laterally clear of the drum where it is accessible for repairs.

3. In a laundry washer, a drum, a dump valve mechanism located at the bottom of said drum, said mechanism comprising a valve seat, a valve disc cooperating with said seat, a lever rockably attached to a block and adapted to support the valve disc in operative position relative to the valve seat, means supporting the block for rotational movement so that the valve disc can be moved out of operative position, and means for locking said lever against rotation in such position that the valve disc is in operative relation, said means comprising a pin slidably mounted in a fixed member and adapted to engage a hole in the block.

4. In a laundry washer, a dump valve comprising a member having a valve seat and a supporting portion, a swivel block mounted on said portion so as to pivot around an axis parallel to that of the valve seat, said portion having an opening carrying a pin which is slidably arranged so as to engage a corresponding opening in the swivel block, and a valve disc supporting lever pivoted to said swivel block so as to be rotatable around an axis at right angles to that of said valve seat.

5. In a gravity dump valve for the outlet opening of a laundry washer, in combination, a drum, a valve seat member secured to said drum and circling said opening, a bracket secured to said drum adjacent said seat member, a block supported for horizontal movement upon said bracket, a treadle lever pivotally mounted for vertical movement upon said block, and a valve disk mounted upon said lever and adapted to co-operate with said valve seat member to close said opening.

In testimony whereof, I have signed my name to this specification this 25th day of October 1928.

LE ROY CHOATE SCHENCK.